US011533714B2

(12) United States Patent
Takeda et al.

(10) Patent No.: US 11,533,714 B2
(45) Date of Patent: Dec. 20, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 127 days.

(21) Appl. No.: 16/620,297

(22) PCT Filed: Jun. 8, 2017

(86) PCT No.: PCT/JP2017/021401
§ 371 (c)(1),
(2) Date: Dec. 6, 2019

(87) PCT Pub. No.: WO2018/225231
PCT Pub. Date: Dec. 13, 2018

(65) Prior Publication Data
US 2021/0084641 A1    Mar. 18, 2021

(51) Int. Cl.
*H04W 72/04* (2009.01)
*H04W 72/12* (2009.01)

(52) U.S. Cl.
CPC ... *H04W 72/0413* (2013.01); *H04W 72/1268* (2013.01)

(58) Field of Classification Search
None
See application file for complete search history.

(56) References Cited

U.S. PATENT DOCUMENTS

| 2016/0127090 A1 | 5/2016 | Takeda et al. | |
| 2017/0367110 A1* | 12/2017 | Li | H04W 74/0816 |
| 2018/0092125 A1* | 3/2018 | Sun | H04W 74/02 |
| 2018/0098349 A1* | 4/2018 | Sun | H04W 72/0406 |
| 2018/0139774 A1* | 5/2018 | Ma | H04W 72/1289 |
| 2018/0288746 A1* | 10/2018 | Zhang | H04L 1/0031 |
| 2018/0294857 A1* | 10/2018 | Rahman | H04L 1/1896 |

(Continued)

FOREIGN PATENT DOCUMENTS

JP    2014-220678 A    11/2014

OTHER PUBLICATIONS

Mahmood et al. "Uplink Grant-Free Access Solutions for URLLC services in 5G New Radio" ISWCS 2019 (Year: 2019).*

(Continued)

*Primary Examiner* — Basil Ma
(74) *Attorney, Agent, or Firm* — Osha Bergman Watanabe & Burton LLP

(57) ABSTRACT

Designed to control UL grant-free transmission properly, a user terminal according to one aspect of the present invention has a transmission section that performs UL grant-free transmission in which UL data is transmitted without a UL transmission indication from a radio base station, and a control section that controls change of parameters for use for the UL grant-free transmission, switching of UL grant-free transmission to UL grant-based transmission, and stopping of UL grant-free transmission, based on physical layer signaling.

10 Claims, 11 Drawing Sheets

| BIT FIELD | DCI FORMAT | | |
|---|---|---|---|
| Carrier indicator (for cross-CC scheduling) | --- | --- | --- |
| NDI (e.g. 1bit) | F1: '0' | F3: '1' | F4: '1' |
| Frequency hopping flag (e.g. 1bit) | - | - | 1 |
| Resource allocation (e.g. 5bits) | ----- | ----- | 11111 |
| Modulation and coding scheme (e.g. 4bits) | ---- | ---- | 1111 |
| Redundancy version (e.g. 2bits) | 00 | -- | 11 |
| HARQ process number (e.g. 3bits) | 000 | --- | --- |
| TPC command for PUSCH (e.g. 2bits) | -- | -- | 11 |
| Cyclic shift DM RS (e.g. 3bits) | --- | --- | 111 |
| CSI request (e.g. 1bits) | 0 | - | 1 |
| SRS request (e.g. 1bits) | 0 | - | 1 |

| - | BIT VALUE OF CHOICE |
|---|---|

(56) References Cited

U.S. PATENT DOCUMENTS

2019/0090222 A1* 3/2019 Wu .................... H04W 72/042

OTHER PUBLICATIONS

R1-1708479 NTT "UL data transmission without grant" 3GPP WG1 #89 Hangzhou May 15-19, 2017 (Year: 2017).*
International Search Reporting issued in PCT/JP2017/021401 dated Aug. 29, 2019 (1 Page).
Written Opinion of the International Searching Authority issued in PCT/JP2017/021401 dated Aug. 29, 2017 (4 Pages).
Huawei et.al.; "WF on procedures of grant-free transmission"; 3GPP TSG WG1 #89, R1-1709537; Hangzhou, China, May 15-19, 2017 (4 Pages).
ZTE; "Consideration on grant-free transmission"; 3GPP TSG-RAN WG2 Meeting #98, R2-1704699; Hangzhou, China, May 15-19, 2017 (5 Pages).
Potevio; "Discussion on UL grant-free tranmission for UPLLC"; 3GPP TSG-RAN WG2 Meeting #98, R2-1705047; Hangzhou, China, May 15-19, 2017 (3 Pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).
Office Action in counterpart Japanese Patent Application No. 2019-523304 dated Feb. 8, 2022 (6 pages).
Extended European Search Report in counterpart European Application No. 17912758.4 dated Nov. 12, 2020 (8 pages).
NTT DOCOMO, Inc.; "UL data transmission without grant"; 3GPP TSG RAN WG1 Meeting #89, R1-1708479; Hangzhou, P.R. China; May 15-19, 2017 (3 pages).
Samsung; "Grant-free and grant-based UL transmission"; 3GPP TSG RAN WG1 Meeting #89, R1-1708024; Hangzhou, China; May 15-19, 2017 (4 pages).
Office Action issued in Australian Application No. 2017417809 dated May 11, 2022 (3 pages).

* cited by examiner

| BIT FIELD | DCI FORMAT | | |
|---|---|---|---|
| Carrier indicator (for cross-CC scheduling) | --- | --- | --- |
| NDI (e.g. 1bit) | F1: '0' | F3: '1' | F4: '1' |
| Frequency hopping flag (e.g. 1bit) | --- | --- | 1 |
| Resource allocation (e.g. 5bits) | --- | --- | 11111 |
| Modulation and coding scheme (e.g. 4bits) | 00 | --- | 1111 |
| Redundancy version (e.g. 2bits) | 000 | --- | 11 |
| HARQ process number (e.g. 3bits) | --- | --- | --- |
| TPC command for PUSCH (e.g. 2bits) | --- | --- | 11 |
| Cyclic shift DM RS (e.g. 3bits) | 0 | --- | 111 |
| CSI request (e.g. 1bits) | 0 | --- | 1 |
| SRS request (e.g. 1bits) | | | 1 |

☐ BIT VALUE OF CHOICE

FIG. 3

| BIT FIELD | DCI FORMAT | | |
|---|---|---|---|
| Carrier indicator (for cross-CC scheduling) | --- | --- | --- |
| NDI (e.g. 1bit) | F1: '0' | F2: '1' <br> F3: '1' | F4: '1 or 0' |
| Frequency hopping flag (e.g. 1bit) | --- | --- | 1 or 0 |
| Resource allocation (e.g. 5bits) | --- | --- | 11111 or 00000 |
| Modulation and coding scheme (e.g. 4bits) | 00 | --- | 1111 or 0000 |
| Redundancy version (e.g. 2bits) | 000 | --- | 11 or 00 |
| HARQ process number (e.g. 3bits) | --- | --- | --- |
| TPC command for PUSCH (e.g. 2bits) | --- | --- | 11 or 00 |
| Cyclic shift DM RS (e.g. 3bits) | --- | --- | 111 or 000 |
| CSI request (e.g. 1bits) | 0 | --- | 1 or 0 |
| SRS request (e.g. 1bits) | 0 | --- | 1 or 0 |

☐ BIT VALUE OF CHOICE

FIG. 4

| BIT FIELD | DCI FORMAT | | |
|---|---|---|---|
| Carrier indicator (for cross-CC scheduling) | --- | --- | --- |
| Function indication (e.g. 2bit) | F1: '00' | F2: '01' F3: '10' | F4: '11' |
| Frequency hopping flag (e.g. 1bit) | --- | --- | 1 |
| Resource allocation (e.g. 5bits) | --- | --- | 11111 |
| Modulation and coding scheme (e.g. 4bits) | 00 | --- | 1111 |
| Redundancy version (e.g. 2bits) | 000 | --- | 11 |
| HARQ process number (e.g. 3bits) | --- | --- | --- |
| TPC command for PUSCH (e.g. 2bits) | 0 | --- | 11 |
| Cyclic shift DM RS (e.g. 3bits) | 0 | --- | 111 |
| CSI request (e.g. 1bits) | 0 | --- | 1 |
| SRS request (e.g. 1bits) | 0 | --- | 1 |

☐ BIT VALUE OF CHOICE

FIG. 5

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, LTE-A (LTE advanced and LTE Rel. 10, 11, 12 and 13) has been standardized for the purpose of achieving increased capacity and enhancement beyond LTE (LTE Rel. 8 and 9).

Successor systems of LTE are also under study (for example, referred to as "FRA (Future Radio Access)," "5G (5th generation mobile communication system)," "5G+ (plus)," "NR (New Radio)," "NX (New radio access)," "FX (Future generation radio access)," "LTE Rel, 14 or 15 and later versions," etc.).

In existing LTE systems (for example, LTE Rel. 8 to 13), downlink (DL) and/or uplink (UL) communication are carried out by using 1-ms subframes (also referred to as "transmission time intervals (TTIs)" and so on). These subframes are the time unit for transmitting 1 channel-encoded data packet, and serve as the unit of processing in, for example, scheduling, link adaptation, retransmission control (HARQ (Hybrid Automatic Repeat reQuest)) and so on.

Furthermore, a radio base station (for example, an eNB (eNode B)) controls the allocation (scheduling) of data to user terminals (UE (User Equipment)), and indicates data scheduling indications to the UEs by using downlink control information (DCI). For example, when UE conforming to existing LTE (for example, LTE Rel. 8 to 13) receives DCI that indicates UL transmission (also referred to as a "UL grant"), the UE transmits UL data in a subframe that is located a predetermined period later (for example, 4 ms later).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

In future radio communication systems (for example, NR), it is likely that data scheduling will be controlled differently than in existing LTE systems. For example, in order to provide communication services that require low latency and high reliability (for example, URLLC (Ultra Reliable and Low Latency Communications)), research is underway to reduce communication latency (latency reduction).

To be more specific, in order to reduce the latency time before UL data transmission is started, studies are in progress to perform communication by permitting contention in UL transmission among multiple UEs. For example, studies are in progress to allow UEs to transmit UL data without UL grants from radio base stations (also referred to as "UL grant-free transmission," "UL grant-less transmission," "contention-based UL transmission," etc.).

However, what control will be applied when a user terminal performs UL grant-free transmission has not been decided yet, and there is a need for a method for controlling UL grant-free transmission properly.

The present invention has been made in view of the above, and it is therefore an object of the present invention to provide a user terminal and a radio communication method, whereby UL grant-free transmission can be controlled properly.

Solution to Problem

According to one aspect of the present invention, a user terminal has a transmission section that performs UL grant-free transmission in which UL data is transmitted without a UL transmission indication from a radio base station, and a control section that controls change of parameters for use for the UL grant-free transmission, switching of UL grant-free transmission to UL grant-based transmission, and stopping of UL grant-free transmission, based on physical layer signaling.

Advantageous Effects of Invention

According to the present invention, UL grant-free transmission can be controlled properly.

BRIEF DESCRIPTION OF DRAWINGS

FIG. 3 is a diagram to show an example of downlink control information according to one embodiment of the present invention;

FIG. 4 is a diagram to show another example of downlink control information according to one embodiment of the present invention;

FIG. 5 is a diagram to show another example of downlink control information according to an embodiment of the present invention;

DESCRIPTION OF EMBODIMENTS

Envisaging future radio communication systems (including, for example, LTE Rel. 14, 15 and later versions, 5G, NR, etc., and hereinafter collectively referred to as "NR"), UL grant-based transmission, in which UL data is transmitted based on UL grants, is not enough by itself to enable communication with low latency, and it is necessary to employ UL grant-free transmission, in which UL data is transmitted without UL grants.

Figure 1:
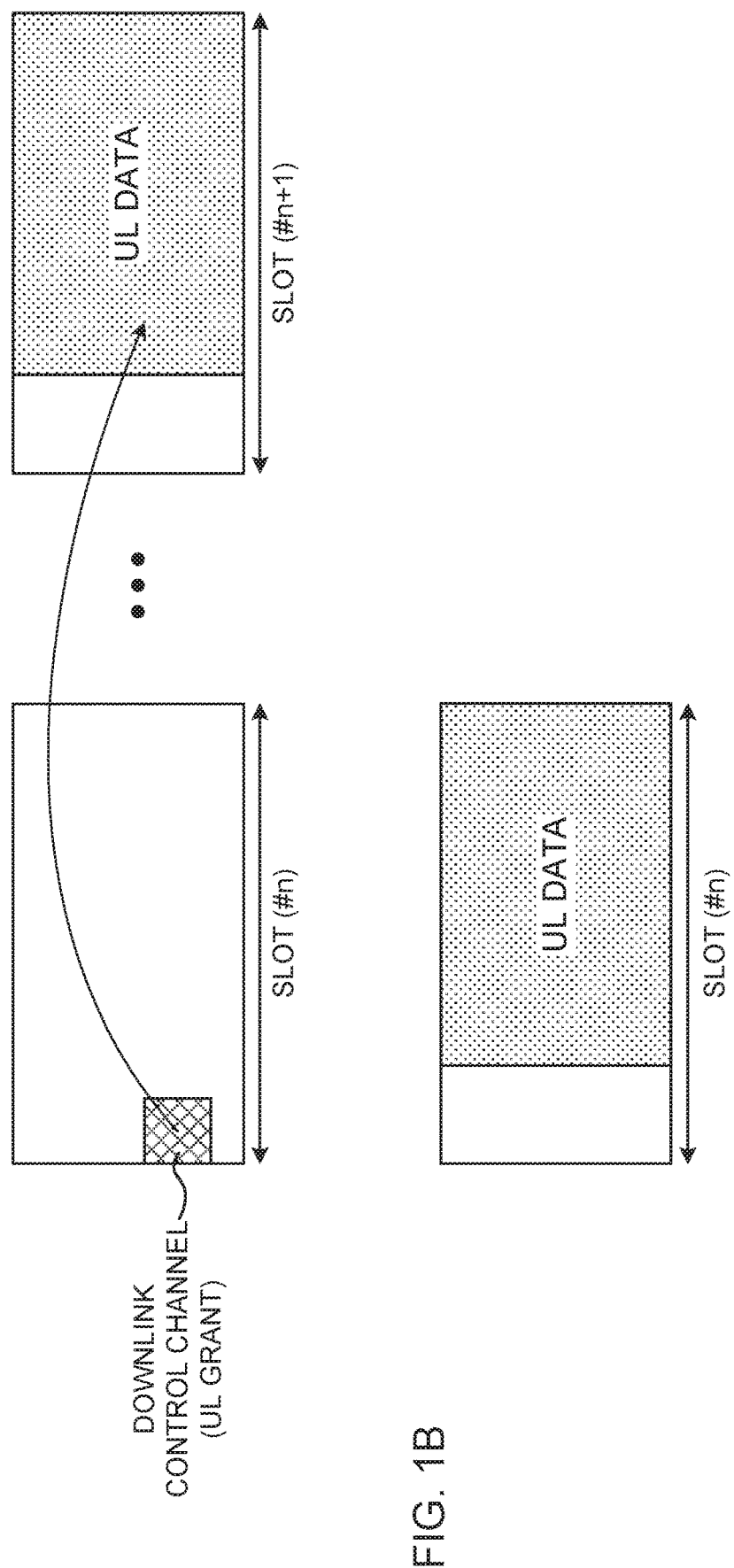
FIG. 1A is a diagram to illustrate UL grant-based transmission.
FIG. 1B is a diagram to illustrate UL grant-free transmission.

Here, UL grant-based transmission and UL grant-free transmission will be explained. FIG. 1A is a diagram to explain UL grant-based transmission, and FIG. 1B is a diagram to explain UL grant-free transmission.

In UL grant-based transmission, as shown in FIG. 1A, a radio base station (which may be referred to as, for example, a "base station (BS)," a "transmission/reception point (TRP)," an "eNode B (eNB)," a "gNB," etc.) transmits a downlink control channel (UL grant) that indicates allocation of UL data (PUSCH (Physical Uplink Shared CHannel)), and UE transmits UL data based on this UL grant (a predetermined timing after the UL grant is received).

Meanwhile, in UL grant-free transmission, as shown in FIG. 1B, UE transmits UL data without receiving UL grants, which are provided for scheduling data.

Also, regarding UL grant-free transmission, studies are underway to repeat transmitting UL data. In repetition transmission of UL data, it is predictable that UE repeats transmitting UL data a predetermined number of times (for example, K times) in units of transport blocks (TBs). For example, UE keeps transmitting TBs corresponding to UL data, until downlink control information (UL grant) to indicate retransmission of UL data is transmitted, or until the number of times transmission is repeated reaches the above predetermined number of times.

Now, for NR, research is underway to provide support for configuring/re-configuring, at least semi-statically, the resource field for allocating the UL data to transmit in UL-grant-free transmission. Studies are underway so that resource configuration covers at least physical time-domain and/or frequency-domain resources.

For example, studies are in progress to configure resources for use in UL grant-free transmission by using higher layer signaling, as is the case with UL semi-persistent scheduling (SPS), which is used in existing LTE (for example, LTE Rel. 8 to 13).

Figure 2:
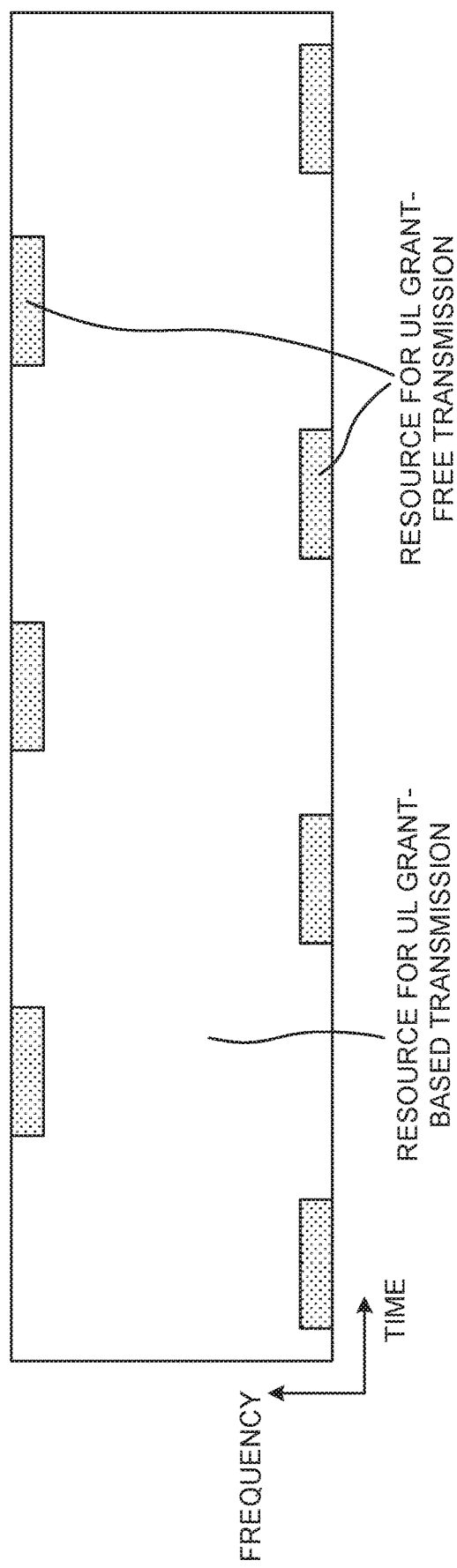
FIG. 2 is a diagram to show examples of resources for use for UL grant-free transmission.

FIG. 2 is a diagram to show examples of resources for use in UL grant-free transmission. As shown in FIG. 2, inter-TTI frequency hopping, intra-TTI frequency hopping and the like may be applied to frequency resources for use in UL grant-free transmission. Also, time resources for use in UL grant-free transmission may be configured contiguously in time, or may be configured non-contiguously (intermittently) in time. Note that resources other than those for use in UL grant-free transmission may be used in UL grant-based transmission.

In this way, although future radio communication systems are expected to support UL grant-free transmission, what kind of control will be applied when this UL grant-free transmission is performed is not decided yet. Therefore, there is a need for a method (mechanism) for controlling UL grant-free transmission properly.

UL grant-free transmission may be controlled by applying the mechanism of UL SPS, which is used in existing LTE. However, in existing LTE's UL SPS, UE performs transmission operation (or transmission process) by using periodically-configured UL resources, no matter whether or not there is UL data to transmit. For this reason, when the cycle in which UL resources are configured for UL SPS (UL SPS cycle) is short, the load of UL transmission processes in UE is likely to increase.

The present inventors have focused on the need for performing UL transmission in existing LTE UL SPS regardless of whether UL data is present or not, and come up with the idea of implementing UL grant-free transmission by executing a skipping operation, in which UL transmission (or UL, transmission process) is not carried out depending on conditions such as whether data is present or not, and configuring the cycle of UL SPS to a predetermined value or less.

Also, the present inventors have focused on the fact that, when UL grant-free transmission is carried out based fully on semi-static configuration (for example, higher layer signaling alone), flexible control might be difficult, and the communication throughput, spectral efficiency and the like might decline. For example, when UL grant-free transmission is configured, control may be exerted so that the transmission parameters for UL grant-free transmission are changed, UL grant-free transmission is stopped, UL grant-free transmission is switched to transmission to use UL grants, and so forth. In this case, if these are controlled based solely on semi-static configuration, there may be a decline in communication throughput, spectral efficiency, and so forth.

Therefore, the present inventors have come up with the idea of reporting functional information that indicates the execution of predetermined functions, to UE that employs UL grant-free transmission, through physical layer (L1 (Layer 1)) signaling, to control UL grant-free transmission. The UE, at least, dynamically changes (or updates) the parameters for use for UL grant-free transmission, switches to UL grant-based transmission, or stops UL grant-free transmission, based on physical layer signaling. With this configuration, UL grant-free transmission can be controlled in a flexible fashion.

Now, embodiments of the present invention will be described in detail below with reference to the accompanying drawings. Note that the radio communication methods according to the herein-contained embodiments may be used individually or may be used in combination.

Note that, in the following embodiments, the prefix "NR-," attached to an arbitrary signal or a channel, may be construed as meaning that the signal or the channel is designed for use in NR. Furthermore, parameters used in UL grant-free transmission (which may be referred to as "radio parameters," "configuration information," etc.) may be referred to as "UL grant-free transmission parameters" Note that, the term "parameter" as used herein may mean a "parameter set," which is a set of one or more parameters.

FIRST EXAMPLE

With a first example of the present invention, a case will be described in which UL grant-free transmission is controlled by controlling the configurations of UL SPS (for example, the UL SPS cycle) and the skipping operation, in which UL transmission is not performed, depending on predetermined conditions (for example, depending on whether UL data is present or not, etc.).

A base station controls the configurations of UL SPS and the configurations of the UL transmission skipping operation (UL transmission skipping) for UE. When configuring UL SPS, the cycle for performing UL transmission (or the resource cycle for UL transmission) may be reported to the UE. If the UE supports the skipping operation, the base station may report, to the UE, whether or not the skipping operation is performed.

The base station configures UL SPS and the skipping operation, through higher layer signaling (for example, RRC signaling, etc.) and L1 signaling (for example, downlink control information) or the like. The base station may configure UL SPS and the skipping operation at the same timing, or the base station may configure them independently. Also, the configurations of UL SPS and the configurations of the skipping operation may be associated with each other.

For example, when the skipping operation is configured (when the skipping operation is ordered), it may be assumed that UL SPS is configured as well.

The UE controls UL, transmission based on the details configured from the base station. For example, when UL SPS (predetermined UL SPS cycle) is configured and the skipping operation is not configured, the UE controls UL transmission based on the same mechanism as existing LTE UL SPS.

When UL SPS (predetermined UL, SPS cycle) is configured and the skipping operation is also configured, the UE controls whether or not to perform UL transmission in each period configured, based on predetermined conditions (for example, based on whether or not there is UL data to transmit, etc.). For example, when there is no UL data to transmit (for example, when the buffer for transmission is empty), the UE exerts control not to perform (that is, skip) UL transmission in UL resources configured. By this means, the UE can control UL transmission operation depending on whether or not there is UL data to transmit, so that unnecessary UL transmission can be omitted, and power consumption can be reduced.

According to the first example, the cycle applied to UL SPS (UL SPS cycle) and the configurations of the skipping operation are controlled, thereby supporting existing UL SPS-based transmission, and UL grant-free transmission (UL grant-free Tx), in which transmission is made only when there is UL data to transmit, Now, methods of configuring the UL SPS cycle and whether or not to perform the skipping operation when transmission to use the conventional mechanism of UL SPS is performed and when UL grant-free transmission is performed, will be described below.

First Configuration Method

In a first configuration method, UL SPS, in which the cycle used is equal to or greater than a first predetermined value (X), is configured, and the operation of skipping UL transmission is not configured (not employed). For example, a base station configures the cycle of UL SPS to 10 ms (X=10 ms) or more, for UE, and does not configure the skipping operation. The UE performs UL transmission operation in the configured cycle (for example, every 10 ms), regardless of whether or not there is UL data to transmit.

In this case, the conventional mechanism of UL SPS can be used, and the mechanism of UL grant-free transmission needs not be used. The mechanism of UL grant-free transmission here refers to a set of operations such as reporting change (update) of transmission parameters, activation, deactivation and so on, by using L1 signaling.

When UL SPS uses a cycle that is longer than a predetermined value, the interval at which UL transmission is carried out becomes longer. Therefore, even when UL transmission is carried out without applying the skipping operation to every UL transmission, it is still possible to prevent the load of UL transmission processes in the UE from increasing. Also, by performing UL SPS in a cycle longer than a predetermined value, it is possible to reduce the overhead of the downlink physical control channel (for example, PDCCH) required to control UL transmission that is carried out periodically with low traffic. Moreover, UL SPS based on a cycle longer than a predetermined value can be suitably applied to both UL and DL.

Second Configuration Method

In a second configuration method, UL SPS, in which the cycle used is equal to or less than a second predetermined value (Y), is configured, and the operation of skipping UL transmission is also configured. For example, a base station configures the cycle of UL SPS to 5 ms (Y=5 ms) or less, for UE, and configures the skipping operation. In this case, the UE controls UL transmission operation for every configured period (for example, every 1 ms), depending on whether or not there is UL data to transmit. If there is no UL data to transmit, the UE may skip UL transmission operation.

This configuration allows the UE to be controlled to perform UL transmission only when there is data. As described above, when UL, grant-free transmission is implemented based on the UL SPS cycle and the skipping operation, L1 signaling may be used to control change (update) of transmission parameters, activation, deactivation and the like. Note that the first predetermined value (X) that was mentioned earlier with the first configuration method and the second predetermined value (Y) may be the same value.

When UL SPS uses a cycle that is equal to or less than a predetermined value, the interval at which UL transmission is carried out becomes shorter. By this means, when UL data to transmit arises, the period it takes before transmitting this UL data can be shortened. As a result of this, the latency that is produced in UL transmission can be reduced.

Also, a configuration may be employed here in which that does not apply an SPS cycle shorter than the second predetermined value to the DL SPS may be used. In this case, in order to realize communication services that require low latency and high reliability (for example, URLLC), in DL, DL data (PDCCH) may be scheduled by the PDCCH. By this means, UL grant-free transmission is performed when the cycle of UL SPS is short, so that the transmission mechanism of SPS is not used in DL or in UL. As a result of this, the same SPS mechanism can be applied to DL and UL only when the cycle of SPS is equal to or greater than a predetermined value.

In addition, when UL transmission is performed based on the configurations of UL SPS cycles below the predetermined value and the skipping operation, the UL transmission may be referred to as "UL grant-free transmission" instead of "SPS-based transmission."

SECOND EXAMPLE

With a second example of the present invention, a case will be described in which predetermined operations are indicated to UE that supports UL grant-free transmission, by using physical layer signaling (L1 signaling). UL grant-free transmission may refer to UL transmission that is performed based on the configurations of UL SPS of a predetermined cycle or less and the skipping operation, as has been illustrated with the first example, or may refer to UL grant-free transmission that is configured independently of UL SPS. Also, the physical layer signaling (L1 signaling) mentioned above may use a PDCCH that adopts a channel format and coding and modulation scheme in common with DL assignment and UL grant, or use a channel that is different from a PDCCH and that is implemented based on a specific channel format and coding and modulation scheme.

A base station reports at least one of the following pieces of information to UE by using physical layer signaling:

F1: Information that indicate the parameters for UL grant-free transmission to change;

F2: Information that indicates UL grant-free transmission to switch to UL grant-based transmission, and information that indicates the parameters (for example, resource) for subsequent UL grant-free transmission to change;

F3: information that indicates UL grant-free transmission to switch to UL grant-based transmission; and F4: Information that commands UL grant-free transmission to stop.

L1 signaling may use downlink control information (for example, UL grants and/or DL assignments). Note that, although 4 types of functional information will be described as examples here, the information to report to UE is not limited to these. For example, F1, F3 and F4 may be defined, while F2 is represented by combining F1 and F3. Also, functional information for reporting the activation of UL grant-free transmission may be separately provided.

If the base station changes at least one of the parameters for UL grant-free transmission in which the UE performs transmission, the base station reports F1 by using L1 signaling. Parameters for UL grant-free transmission are configured in advance in the UE by higher layer signaling (for example, RRC signaling), and some or all of the parameters are updated by using L1 signaling. Note that the communication parameters to configure in the UE in advance may be included in UL grant-free configurations (UL GF configurations) and configured in the UE.

If F1 is reported in L1 signaling, the UE changes the parameters for subsequent UL grant-free transmission. For example, the UE performs UL grant-free transmission by changing some of the parameters of UL grant-free configurations configured in advance. The communication parameters of UL grant-free configurations include at least one of a parameter related to numerology (for example, subcarrier spacing (SCS), TTI length, etc.), a parameter related to the waveform, a parameter related to codeword (CW) mapping, a parameter related to time and/or frequency resources, a parameter related to the number of HARQ processes, a parameter related to the modulation and coding scheme (MCS), a parameter related to the redundancy version (RV), a parameter related to power control, a parameter related to the frequency hopping pattern, a parameter related to repetition transmission, and the like. Change of parameters may be valid for a predetermined period (that is, after a predetermined period, the parameters will be reset, back to the transmission parameters configured by higher layer signaling before F1 is reported by L1 signaling), or may be valid until change of parameters is indicated again by higher layer signaling or L1 signaling.

The base station reports F2 or F3 by using L1 signaling when ordering the UE to perform UL grant-based UL transmission. For example, when the base station fails to receive UL grant-free transmission (for example, a NACK) that is transmitted from the UE, it may be possible then the base station transmits a UL grant and indicates retransmission of the data that was transmitted in that UL grant-free transmission. In this case, the base station reports F2 or F3 to the UE to control UL retransmission. If the parameters of UL grant-free transmission performed after UL grant-based transmission in the UE are changed, F2 may be used, and if not changed, F3 may be used.

When the UE receives L1 signaling that carries F2 or F3 the UE performs UL transmission after a predetermined period based on that L1 signaling. Note that the UE may exert control so that, after UL grant-based transmission based on this L1 signaling is performed a predetermined number of times (for example, once), the UE resumes the state of UL grant-free transmission, or the UE may exert control so that, when a predetermined period (for example, a predetermined timer period) passes after the above L1 signaling is received, the UE switches back to UL grant-based transmission again.

When the base station stops the UL grant-free transmission from the UE, the base station reports F4 by using L1 signaling. For example, when the base station successfully receives the UL grant-free transmission transmitted from the UE, it may be possible to control subsequent UL transmission based on UL grants. In this case, the base station, upon receiving the UL grant-free transmission successfully, transmits L1 signaling that carries F4, to the UE. The transmission of L4 in this case can be seen as being equivalent to reporting an ACK in response to the UL grant-free transmission.

Alternatively, the base station may not need UL grant-free transmission transmitted from the UE. In this case, the base station reports F4 to stop UL grant-free transmission. The transmission of F4 in this case may be equivalent to reporting deactivation of UL grant-free transmission.

The UE may identify, based on the bit information of a predetermined bit field included in L1 signaling and/or the like, the type of the functional information reported by this L1 signaling (for example, which of F1 to F4 this functional information corresponds to). For example, the UE identifies F1 to F4 (or F1, F3 and F4) by using a predetermined bit field included in existing downlink control information (for example, DCI format that indicates UL transmission). As for the predetermined bit field, for example, a new data indicator (NDI) the redundancy version (RV), the HARQ process number (HPN) or the like may be used.

Now, the method of reporting F1 to F4 (or F1, F3 and F4) by using downlink control information will be described below with reference to specific examples. As for the downlink control information, DCI formats to indicate UL transmission (for example, DCI format 0, 4, and/or others) can be used.

Supporting F1, F3 and F4

FIG. 3 shows a case in which F1, F3 and F4 are reported to UE by using downlink control information. The UE judges, based on the bit information of a predetermined bit field included in the downlink control information, which of F1, F3 and F4 the downlink control information corresponds to. For example, the UE configures F1 and F3 so that the bit information of a predetermined bit field (for example, NDI) varies. Here, a case is shown where "0" is associated with the NDI field of F1, and "1" is associated with the NDI field of F3.

Also, F4 is information for indicating UL grant-free transmission to stop, so that there is no need to report the parameters for use for UL grant-free transmission. Consequently, among the bit fields included in downlink control information, bit fields that do not need to be reported to the UE are configured to predetermined values (for example, 1). By this means, even when F4 and another piece of functional information (for example, F1) share the same NDI bit field value, the UE can distinguish between F1 and F4 based on the bit information of the other bit fields. Note that, some of the bit fields (for example, HPN) in the downlink control information that reports F4 may be configured to values other than a predetermined value (for example, 1). This is to allow the UE to identify which UL grant-free transmitted data the HARQ process indicator that was used to report F4 corresponds to. In other words, when a plurality of HARQ process indicators can be assigned in UL grant-free transmission, the user terminal is able to identify which HARQ process indicators ACK-yielding data corresponds to, using the HARQ process indicators contained in F4.

If the UE judges that the downlink control information corresponds to F1 (F1 has been reported) based on a predetermined bit field, the UE changes the parameters for UL grant-free transmission based on this downlink control information. For example, in the UL grant-free transmission that takes place after downlink control information is received, at least one of the hopping parameter, the resource allocation for use for UL transmission, the modulation and coding scheme (MCS), the transmission power for UL transmission (for example, PUSCH), and the cyclic shift for UL reference signals, is changed. Note that parameters that do not need to be changed (for example, RV, HPN, CSI request, SRS request, etc.) may be configured to predetermined bit values on a fixed basis (for example, "0").

If the UE judges that the downlink control information corresponds to F3 (F3 has been reported) based on a predetermined bit field, the UE switches to UL grant-based UL transmission based on this downlink control information. The base station reports F3 when, for example, ordering retransmissions (Re-Tx) of UL grant-free transmissions transmitted from the UE.

The UE performs UL grant-based transmission (for example, transmission after a predetermined period) based on parameters included in the downlink control information corresponding to F3. The UP performs UL grant-based UL transmission based on the hopping parameter, the allocation of resources for use for UL transmission, the modulation and coding scheme (MCS), the RV, the HPN, the transmission power for UL transmission (for example, PUSCH), the cyclic shift for reference signals, the CSI request, the SRS request and the like, included in the downlink control information. The resources specified by the resource allocation for use in UL transmission may be resources that are not configured for UL grant-free transmission (for example, resources for use for UL grant). Alternatively, predetermined resources amongst the resources configured in advance for UL grant-free transmission may be used.

When the UE performs UL grant-based transmission after performing UL grant-based UL transmission once, the UE may use the parameters that are already configured, as parameters for the UL, grant-free transmission.

If the UE judges that the downlink control information corresponds to F4 (F4 has been reported) based on a predetermined bit field, the UE stops UL grant-free transmission.

In this way, by distinguishing between multiple types of functional information based on a predetermined bit field included in downlink control information, it is possible to prevent the overhead of downlink control information from increasing even when multiple types of functional information are reported to UE.

Note that, if the UE recognizes that F1 or F3 has been reported, the UE may transmit a delivery acknowledgment signal (ACK), in response to the receipt of this L1 signaling, via a predetermined channel, at a predetermined timing. For example, if the UE recognizes that F1 has been reported, the UE may transmit a delivery acknowledgment signal, in response to the receipt of F1, by using the data channel for UL grant-free transmission based on the transmission parameters configured by F1 (or the MAC CE or the MAC PDU included in the data channel), or the UE may transmit the delivery acknowledgment signal in response to the receipt of F1 by using an uplink control channel (PUCCH) that is determined in association with F1. Also, if the UE recognized that F3 has been reported, the UE may transmit a delivery acknowledgment signal, in response to the receipt of F3, by using the UL grant-based data channel designated by F3 (or the MAC CE or the MAC PDU included in the data channel or a predetermined resource element included in the data channel), or the UE may transmit the delivery acknowledgment signal in response to the receipt of F3 by using an uplink control channel (PUCCH) that is determined in association with F3. The delivery acknowledgment in response to the receipt of F3 may be skipped, with UL data transmission (that is, no delivery acknowledgment is transmitted even if F3 is received properly) if there is no data to transmit and UL skipping is configured.

Supporting F1 to F4

FIG. 4 shows a case in which F1 to F4 are reported to UE by using downlink control information. In this case, to distinguish among F1, F2/F3 and F4, the method of distinguishing among F1, F3 and F4, which has been described above with reference to FIG. 3, may be used.

A method may be employed here, in which F2 and F3 are each associated with L1 signaling transmission conditions so as to distinguish between them implicitly, or a method may be used, in which the resource allocation to be reported in F2 and/or in F3 is limited, so as to distinguish between them.

Implicit Distinguishing of F2/F3

F2 and F3 may be distinguished based on at least one of the slot used to transmit L1 signaling, the aggregation level (AL) and the search space (SS). For example, when L1 signaling is transmitted using at least one of the first slot, the first AL, and the first SS, the UE judges that this L1 signaling corresponds to F2. For example, when L1 signaling is transmitted using at least one of the second slot, the second AL, and the second SS, the UE judges that this L1 signaling corresponds to F3.

If the UE judges that the L1 signaling corresponds to F2 based on a predetermined bit field, the UE switches to UL grant-based UL transmission based on this L1 signaling. For example, the base station reports F2 when ordering retransmission of UL, grant-free transmission that is transmitted from the UE, and changing the parameters for subsequent UL grant-free transmission.

The UE may perform UL grant-based transmission based on communication parameters included in L1 signaling corresponding to F2. The UE performs UL grant-based UL transmission based on the hopping parameter, the allocation of resources for use for UL transmission, the modulation and coding scheme (MCS), the RV, the HPN, the transmission power for UL transmission (for example, PUSCH), the cyclic shift for UL reference signals, the CSI request, the SRS request and the like, included in the L1 signaling. Note that the resource allocation parameter in F2 may be designed so that the parameter for UL grant-based UL transmission, and the parameter for subsequent UL grant-free transmission may specify the same resource in the same field, or separate fields may be included in F2 and specify different resources.

When the UE performs UL grant-free transmission after performing UL grant-based UL, transmission (for example, 1 shot) based on L1 signaling corresponding to F2, parameters reported in L1 signaling corresponding to F2 may be used as parameters for this UL, grant-free transmission. When the UE performs UL grant-free transmission after performing UL grant-based UL transmission (for example, 1 shot) based on L1 signaling corresponding to F3, parameters configured before the L1 signaling corresponding to F3 may be used as parameters for this UL grant-free transmission.

Distinguishing of F2/F3 Based on Resource Allocation Limitation

F2 and F3 may be distinguished based on resource allocation information included in L1 signaling. For example, if the resource allocation included in L1 signaling indicates the first resource, the UE judges that this L1 signaling corresponds to F2. On the other hand, if the resource allocation included in L1 signaling indicates the second resource, the UE judges that this L1 signaling corresponds to F3.

For example, when the resource allocation information included in L1 signaling indicates the same resource as the resource configured for UL grant-free transmission, the UE judges that this L1 signaling corresponds to F3. If a different resource (for example, a resource for use for UL grant based transmission) is indicated, the UE judges that this L1 signaling corresponds to F2.

When the UE performs UL grant-free transmission after performing UL grant-based UL transmission (for example, 1 shot) based on downlink control information corresponding to F2, parameters reported in the downlink control information corresponding to F2 may be used as parameters for this UL grant-free transmission. When the UE performs UL grant-free transmission after performing UL grant-based UL transmission (for example, 1 shot) based on downlink control information corresponding to F3, parameters configured before the downlink control information corresponding to F3 may be used as parameters for this UL grant-free transmission.

Alternatively, if the resource allocation information included in L1 signaling indicates the same resource as the resource configured for UL grant-free transmission, the LE judges that this L1 signaling corresponds to F2, and, if the resource allocation information indicates a resource (for example, a resource for use for UL grant based transmission), the UE judges that this L1 signaling corresponds to F3. In this case, the resources for use for UL grant-based UL transmission can be scheduled by F3, without changing UL grant-free resources.

Explicit Distinguishing of F1 to F4

Alternatively, physical layer signaling may be configured with bit information identifying F1 to F4, and reported to the UE explicitly. For example, a new bit field (also referred to as, for example, "function indication") may be provided in downlink control information, and the bit information to identify F1 to F4 may be included in the bit field (see FIG. 5). For example, a new bit field can be defined using 2 bits, and F1 can be made "00," F2 "01," F3 "10," and F4 "11." In this case, a configuration may be employed here, in which downlink control information includes no NDI field.

In this way, one of F1 to F4 is indicated to UE by using a new bit field, so that control can be exerted without limiting the conditions (slot, AL, SS etc.) for transmitting downlink control information to distinguish between F2 and F3.

THIRD EXAMPLE

With a third example of the present invention, a signaling method for physical layer signaling for when applying multiple configurations (UL GF configurations) to UL grant-free transmission will be described below.

When UL grant-free transmission is used, it may be possible that multiple UL grant-free configurations are supported. As described earlier, UL grant-free configurations include communication parameters related to numerology (for example, subcarrier spacing (SCS), TTI length, etc.) and the like.

In this case, it is necessary to identify, on the UE side, which UL grant-free configurations the physical layer signaling that reports predetermined functional information (for example, F1 to F4) corresponds to. To be more specific, when receiving F1 that reports a indication to change communication parameters, UE needs to specify to which UL grant-free configuration this F1 should be applied. Hereinafter, a method of identifying UL grant-free configurations based on which transmission conditions are applied to L1 signaling (identification method 1), a method of including information to indicate UL grant-free configurations in L1 signaling (identification method 2), and a method of associating predetermined functional information in L1 signaling with UL grant-free configurations (identification method 3), will be described below.

Identification Method 1

In identification method 1, transmission conditions (for example, communication parameters) to apply to L1 signaling and predetermined UL grant-free configurations are set forth associated with each other. In this case, UE judges which UL grant-free configurations L1 signaling that is received corresponds to (the functional information indicated by L1 signaling is applied), based on the transmission conditions of L1 signaling received, and so forth.

As for the transmission conditions to apply to L1 signaling, at least one of a slot, the SS, and the AL may be used. For example, when L1 signaling is transmitted using at least one of the first slot, the first AL, and the first SS, the UE judges that this L1 signaling corresponds to UL grant-free configuration #1. On the other hand, when L1 signaling is transmitted using at least one of the second slot, the second AL, and the second SS, the UE judges that this L1 signaling corresponds to UL grant-free configuration #2.

Alternatively, numerologies (for example, communication parameters) (for example, subcarrier spacing (SCS), TTI length, etc.) may be used as transmission conditions to apply to L1 signaling. For example, if UL grant-free configuration 41 is defined based on the first SCS (for example, 15 kHz) and/or the first TTI length, the UE judges that the L1 signaling that is transmitted in the DL channel of the first SCS and/or the first TTI length corresponds to UL grant-free configuration #1. Also, if UL grant-free configuration #2 is defined based on the second. SCS (for example, 30 kHz) and/or the second TTI length, the UE judges that the L1 signaling that is transmitted in the DL channel of the second SCS and/or the second TTI length corresponds to UL grant-free configuration #2.

In this way, by associating the conditions for transmission to apply to L1 signaling and UL grant-free configurations with each other, it is no longer necessary to separately report information showing the association between them, so that it is possible to reduce the increase of DL overhead.

Identification Method 2

In identification method 2, information about the UL grant-free configuration, to which functional information of L1 signaling is applied, is included in this L1 signaling and reported to UE. The L1 signaling functional information may be at least one of activation, deactivation, and F1 to F4.

For example, if the UE receives L1 signaling including information to indicate UL grant-free configuration #1, the UE applies the functional information included in the L1 signaling to UL grant-free configuration #1. If the functional information included in the L1 signaling is information to indicate change of transmission parameters, the UE controls UL grant-free transmission by changing the communication parameters in UL grant-free configuration #1.

In this way, by including and reporting information about the UL grant-free configurations, to which functional information is applied, in L1 signaling, it is possible to configure the transmission conditions for L1 signaling flexibly compared to identification method 1.

Identification Method 3

In identification method 3, predetermined functional information of L1 signaling and UL grant-free configuration are set forth associated with each other. For example, one or more UL grant-free configurations (for example, UL grant-free configuration #0) are associated with functional information F1. Similarly, one or more different UL grant-free configurations (for example, UL grant-free configuration #1) are associated with functional information F3, and one or more different UL grant-free configurations (for example, UL grant-free configuration #2) are associated with functional information F4.

The UE judges, based on the functional information indicated by signaling received, to which UL grant-free configuration this functional information is applied. For example, when L1 signaling reports functional information F1, the UE applies this F1 to UL grant-free configuration #0.

In this way, by associating predetermined functional information of L1 signaling and UL grant-free configurations with each other, it is no longer necessary to separately report information showing the association between them, so that it is possible to reduce the increase of DL overhead.

Radio Communication System

Now, the structure of a radio communication system according to one embodiment of the present invention will be described below. In this radio communication system, communication is performed using one of the radio communication methods according to the herein-contained embodiments of the present invention, or a combination of these.

Figure 6:
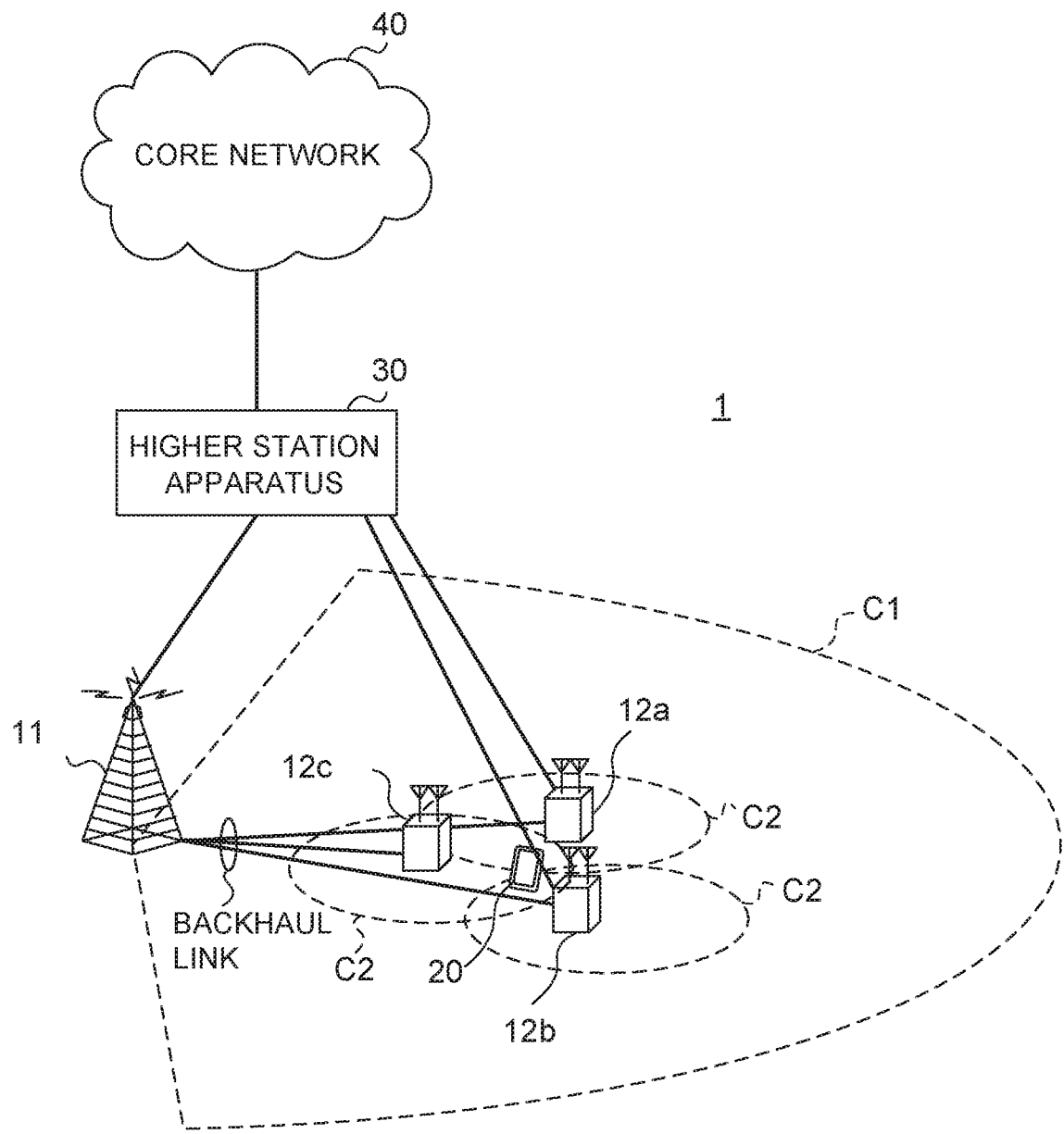
FIG. 6 is a diagram to show an exemplary schematic structure of a radio communication system according to one embodiment of the present invention.

FIG. 6 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

The radio base station 11 and a radio base station 12 (or 2 radio base stations 12) may be connected with each other by cables (for example, by optical fiber, which is in compliance with the CPRI (Common Public Radio interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "feinto base stations," "HeNBs (Home eNodeBs)." "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-TDMA) and/or OFDMA are applied to the uplink.

OFDMA is a multi-carrier communication scheme to perform communication by dividing a frequency bandwidth into a plurality of narrow frequency bandwidths (subcarriers) mapping data to each subcarrier. SC-TDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator Channel), a PHICH (Physical Hybrid-ARQ Indicator Channel) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system cell-specific reference signals (CRSS), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

Radio Base Station

Figure 7:
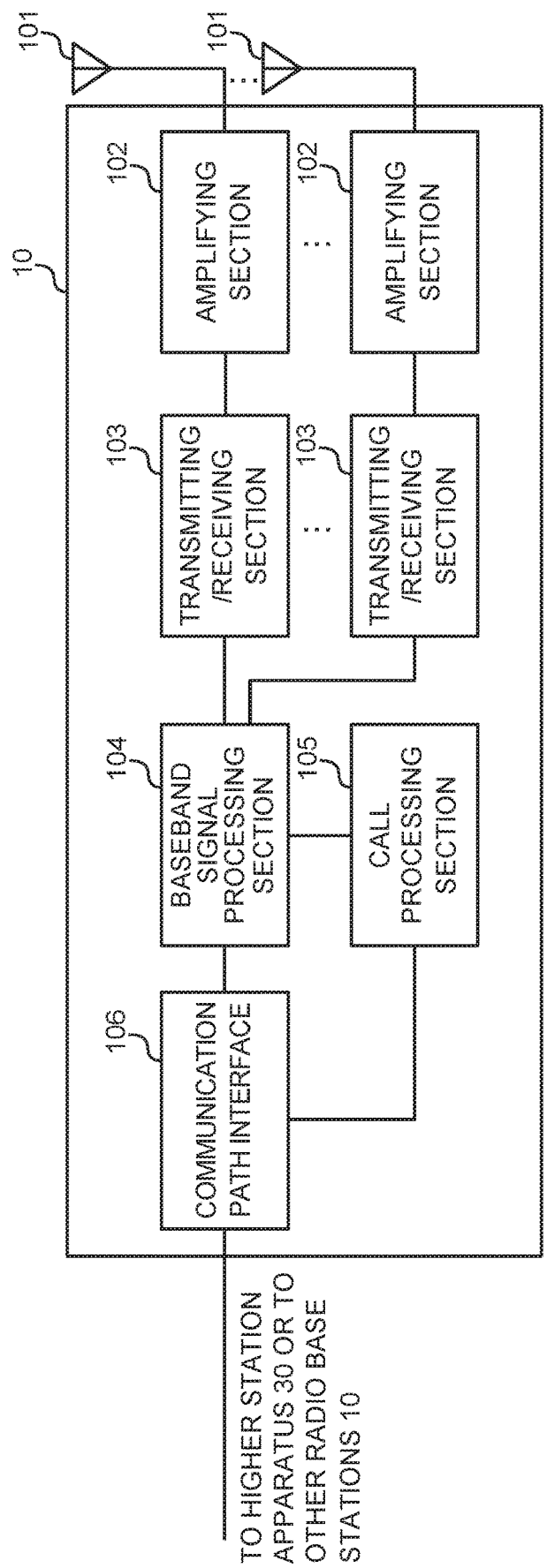
FIG. 7 is a diagram to show an exemplary overall structure of radio base station according to one embodiment of the present invention.

FIG. 7 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (EFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 receive data from a user terminal 20, which is transmitted via UL, grant-free transmission, in which UL data is transmitted without UL transmission indicates (UL grants) from the radio base station 10. Also, the transmitting/receiving sections 103 transmit, to the user terminal 20, L1 signaling that reports functional information. As for L1 signaling to report functional information, at least one of L1 signaling to carry one of L1 to L4, which have been described above, and L1 signaling for activation may be transmitted to the user terminal 20. In addition, the transmitting/receiving sections 103 may transmit information about UL grant-free transmission parameters, information about UL grant-free configurations and so on, to the user terminal 20.

Figure 8:
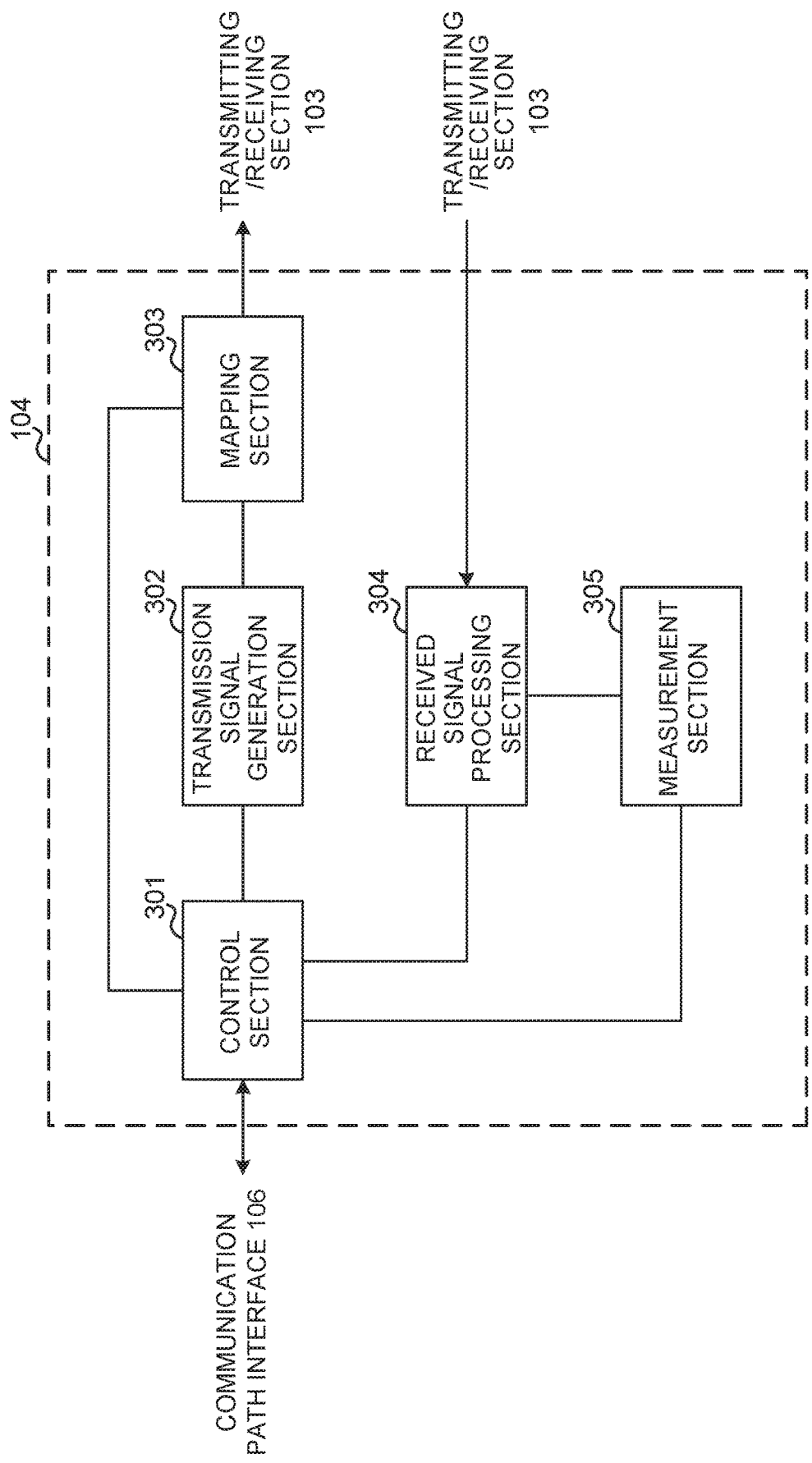
FIG. 8 is a diagram to show an exemplary functional structure of radio base station according to one embodiment of the present invention.

FIG. 8 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305, Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDSCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

Also, the control section 301 controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and the like.

The control section 301 includes the functional information which the user terminal 20 needs to control UL grant-free transmission, in L1 signaling, and controls the generation/reporting. Also, by means of the above physical layer signaling, the control section 301 may control based on which parameters UL grant-free transmission is to be performed, control whether UL grant-free transmission is used or not, and so on.

The control section 301 may exert control so that L1 signaling to include functional information is transmitted, to the user terminal 20, to allow the user terminal 20 to override and/or activate the UL grant-free configurations set up by higher layer signaling (for example, RRC signaling).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL, grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength indicator)), transmission path information (for example, CSI), and so on. The measurement results may be output to the control section 301.

User Terminal

Figure 9:
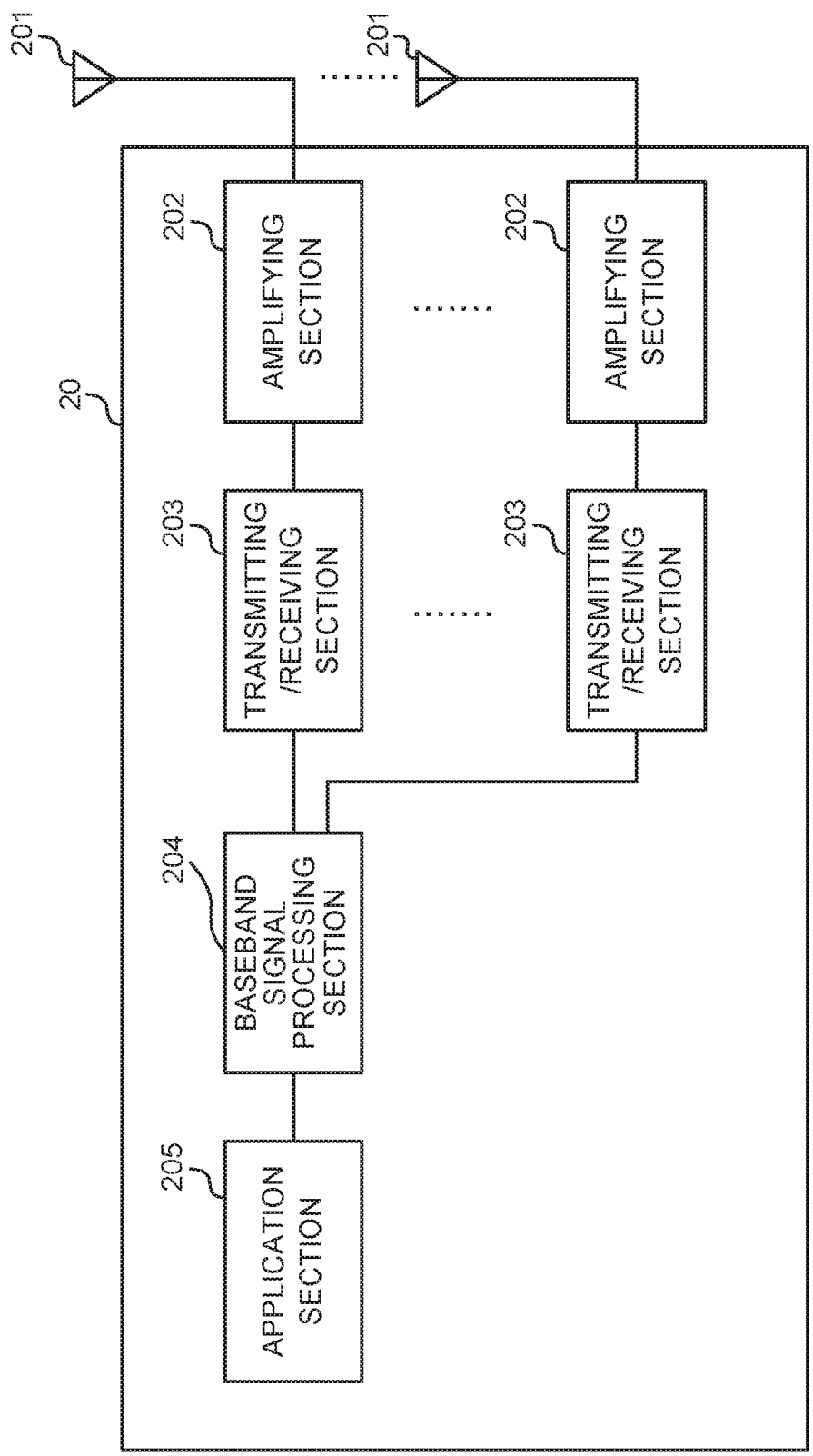
FIG. 9 is a diagram to show an exemplary overall structure of a user terminal according to one embodiment of the present invention.

FIG. 9 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit UL data without UL transmission commands (UL grants) from the radio base station 10. In addition, the transmitting/receiving sections 203 receive L1 signaling that reports functional information (F1 to F4). As for L1 signaling to report functional information, at least one of L1 signaling to carry one of L1 to L4, which have been described earlier, and L1 signaling for activation may be received. In addition, the transmitting/receiving sections 203 may receive information about UL grant-free transmission parameters, information about UL grant-free configurations and so on.

Figure 10:
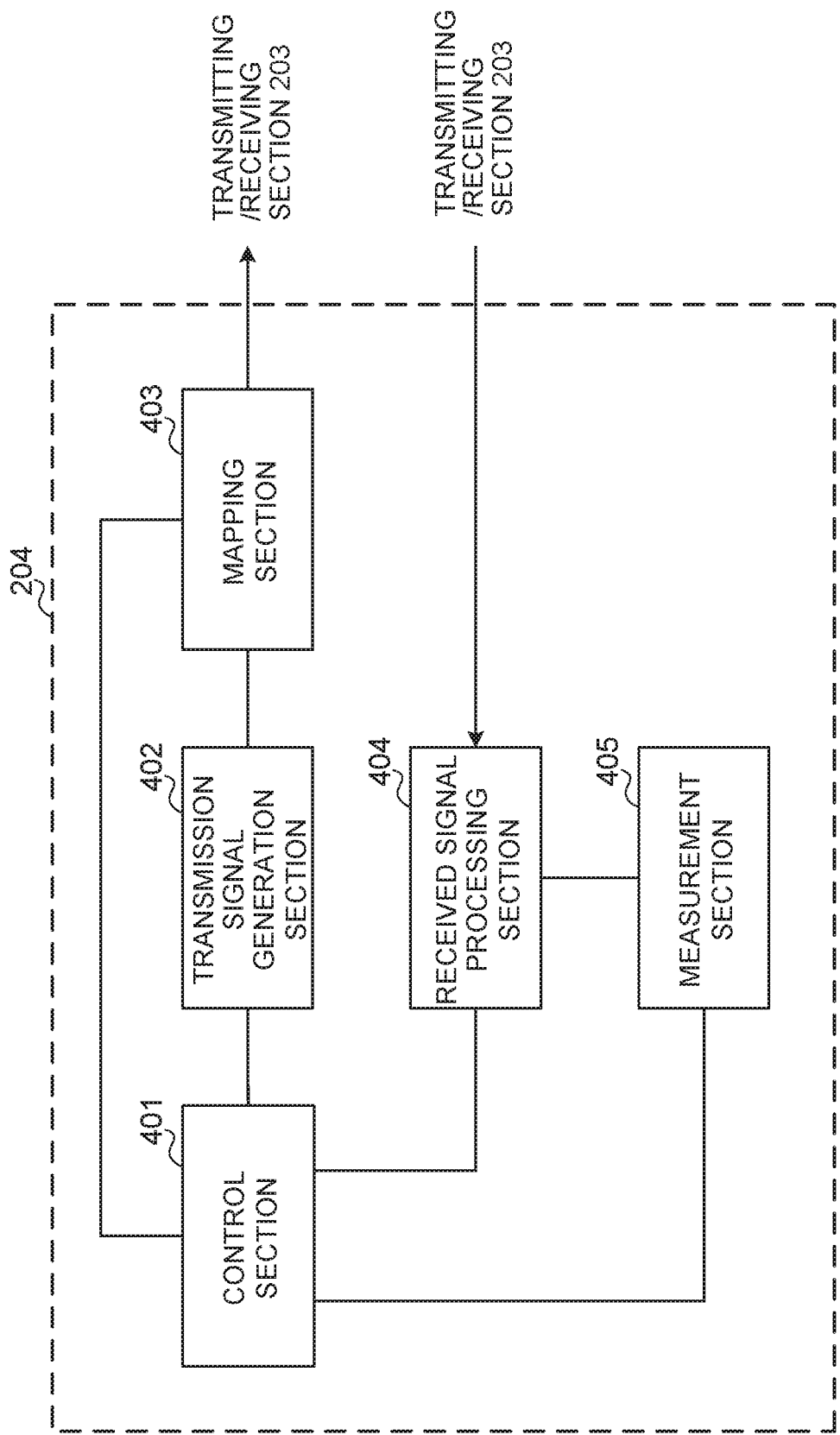
FIG. 10 is a diagram to show an exemplary functional structure of a user terminal according to one embodiment of the present invention.

FIG. 10 is a diagram to show an exemplary functional structure of a user terminal according to one embodiment of the present invention. Note that, although this example primarily shows functional blocks that pertain to characteristic parts of the present embodiment, the user terminal has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 controls at least one of change of parameters for use for UL, grant-free transmission, switching from UL grant-free transmission to UL grant-based transmission, and stopping of UL grant-free transmission based on L1 layer signaling. For example, based on the bit information of a predetermined field included in physical layer signaling, the control section 401 may exert control so that, at least, the parameters for use for UL grant-free transmission are changed, UL grant-free transmission is switched to UL grant-based transmission, or UL grant-free transmission is stopped.

Also, based on the slot in which physical layer signaling is transmitted, the aggregation level and the search space, or the UL resource specified by physical layer signaling, the control section 401 may exert control so that, at least, the parameters for use for UL grant-free transmission are changed, UL grant-free transmission is switched to UL grant-based transmission, or UL grant-free transmission is stopped.

Also, the control section 401 may select the UL grant-free configurations, to which the functional information reported by physical layer signaling is applied, based on bit information of physical layer signaling, the condition for transmitting physical layer signaling, and the type of functional information reported in physical layer signaling.

Also, the control section 401 may also control UL grant-free transmission based on the configurations of UL semi-persistent scheduling, which has a shorter cycle than a predetermined cycle, and the configurations of UL transmission skipping operation in resources configured for UL transmission, depending on whether or not there is UL data to transmit.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

Hardware Structure

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 11:
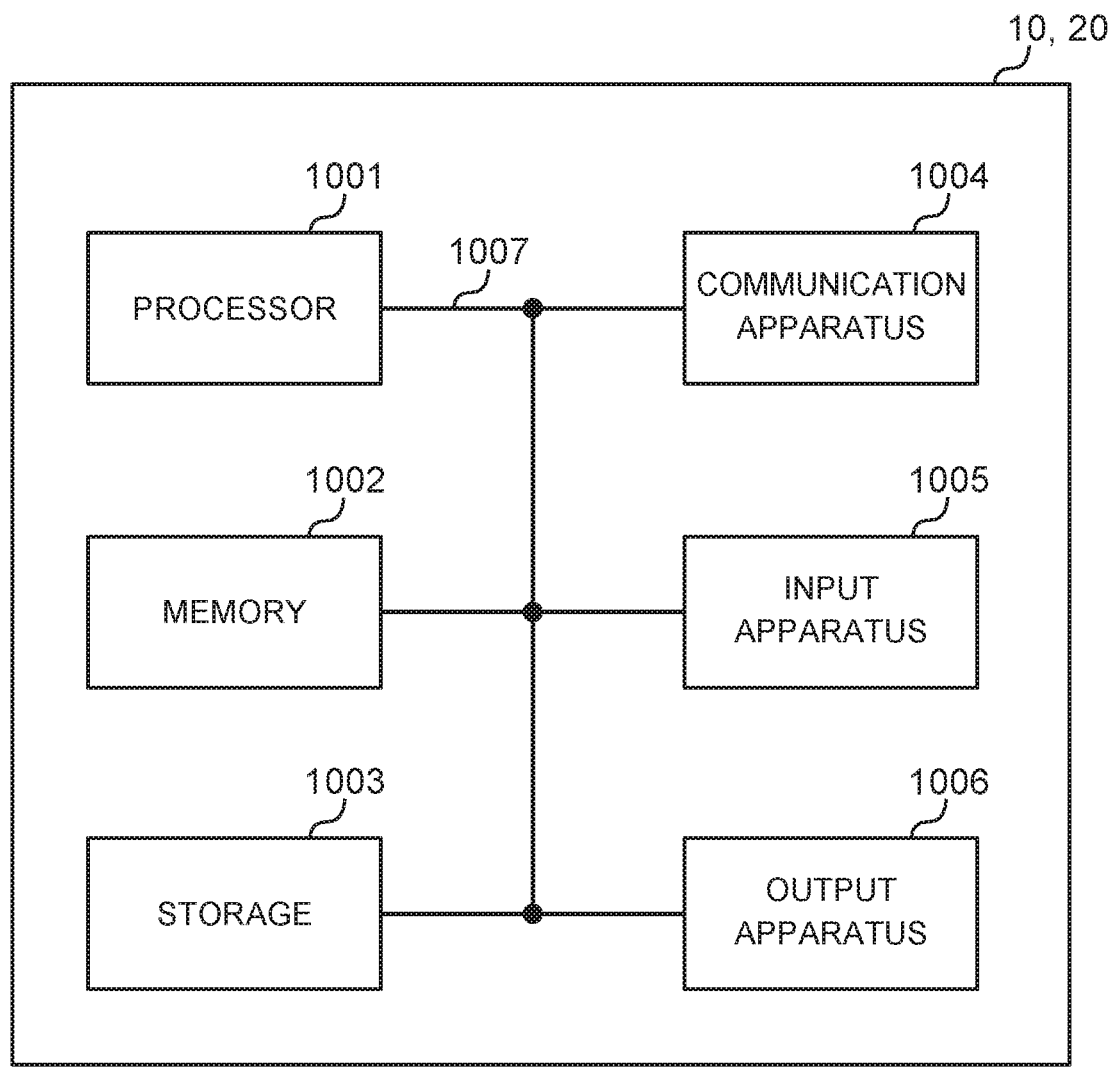
FIG. 11 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 11 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD), For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a mini slot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI" That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of mini-slots) to constitute this minimum time unit of scheduling may be controlled.

A TTI having a time duration of 1 ms may be referred to as a "normal TTI" (TTI in UE Rel. 8 to 12), a "long TTI," a "normal subframe," a "long sub frame," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, LAM (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiving section that receives information about resources of a Physical Uplink Shared Channel (PUSCH) by higher layer signaling; and
a control section that controls, based on the information and downlink control information (DCI) for updating transmission of the PUSCH in the resources,
wherein when a first field and second field in the downlink control information have a first value, the control section specifies a transmission parameter applied for the PUSCH based on the downlink control information, and when the first field and second field in the downlink control information have the first value and a third field and fourth field in the downlink control information have a second value, the control section exerts a control to deactivate the PUSCH, and
wherein each field in the downlink control information relates to a PUSCH transmission parameter signaled by L1 signaling.

2. The terminal according to claim 1, wherein the transmission parameter includes a hopping parameter, resource allocation, and modulation and coding scheme.

3. The terminal according to claim 2, wherein the control section exerts a control not to perform transmission of the PUSCH, when a buffer is empty.

4. The terminal according to claim 2, wherein the control section exerts a control to repeat transmission of the PUSCH in units of transport blocks.

5. The terminal according to claim 1, wherein the control section exerts a control not to perform transmission of the PUSCH, when a buffer is empty.

6. The terminal according to claim 5, wherein the control section exerts a control to repeat transmission of the PUSCH in units of transport blocks.

7. The terminal according to claim 1, wherein the control section exerts a control to repeat transmission of the PUSCH in units of transport blocks.

8. A radio communication method comprising:
receiving information about resources of a PUSCH by higher layer signaling; and
controlling, based on the information and downlink control information (DCI) for updating transmission of the PUSCH in the resources,
wherein when a first field and second field in the downlink control information have a first value, a transmission parameter applied for the PUSCH is specified based on the downlink control information, and when the first field and second field in the downlink control information have the first value and a third field and fourth field in the downlink control information have a second value, the PUSCH is controlled to be deactivated, and
wherein each field in the downlink control information relates to a PUSCH transmission parameter signaled by L1 signaling.

9. A base station comprising:
transmitting section that transmits information about resources of a PUSCH to a terminal by higher layer signaling; and
a receiving section that receives the PUSCH in the resources transmitted by the terminal based on the information and downlink control information (DCI),
wherein when a first field and second field in the downlink control information have a first value, a transmission parameter applied for the PUSCH is specified in the terminal based on the downlink control information, and when the first field and second field in the downlink control information have the first value and a third field and fourth field in the downlink control information have a second value, the PUSCH is deactivated in the terminal, and
wherein each field in the downlink control information relates to a PUSCH transmission parameter signaled by L1 signaling.

10. A system comprising a base station and a terminal, the base station comprising:
a transmitting section that transmits information about resources of a PUSCH to a terminal by higher layer signaling; and
a receiving section that receives the PUSCH in the resources transmitted by the terminal based on the information and downlink control information (DCI),
the terminal comprising:
a receiving section that receives the information; and
a control section that controls, based on the information and DCI for updating transmission of the PUSCH in the resources,
wherein when a first field and second field in the downlink control information have a first value, the control section specifies a transmission parameter applied for the PUSCH based on the downlink control information, and when the first field and second field in the downlink control information have the first value and a third field and fourth field in the downlink control information have a second value, the control section exerts a control to deactivate the PUSCH, and
wherein each field in the downlink control information relates to a PUSCH transmission parameter signaled by L1 signaling.

* * * * *